R. F. BERAN.
COTTON PICKING DEVICE.
APPLICATION FILED MAR. 20, 1914.

1,169,915.

Patented Feb. 1, 1916.
3 SHEETS—SHEET 1.

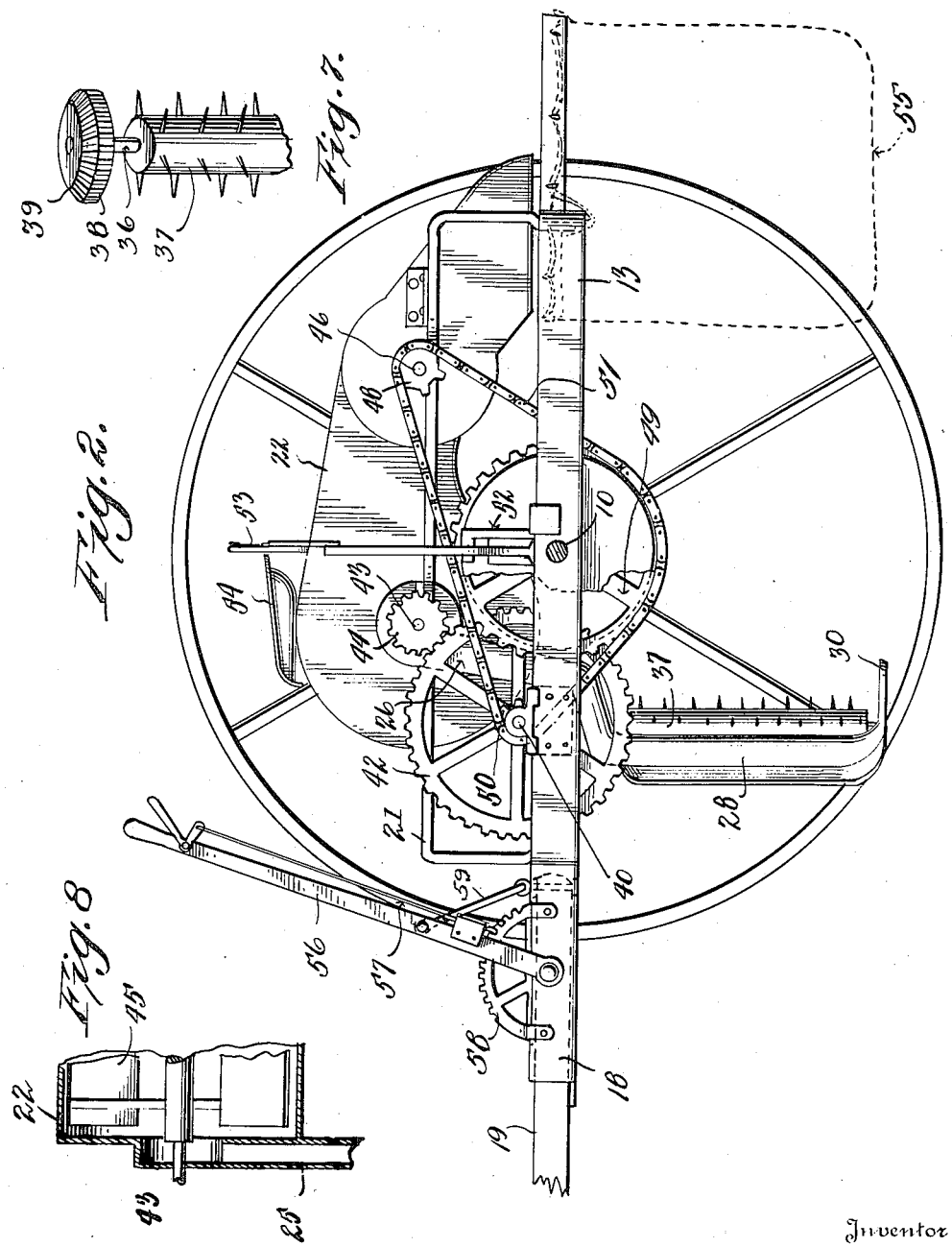

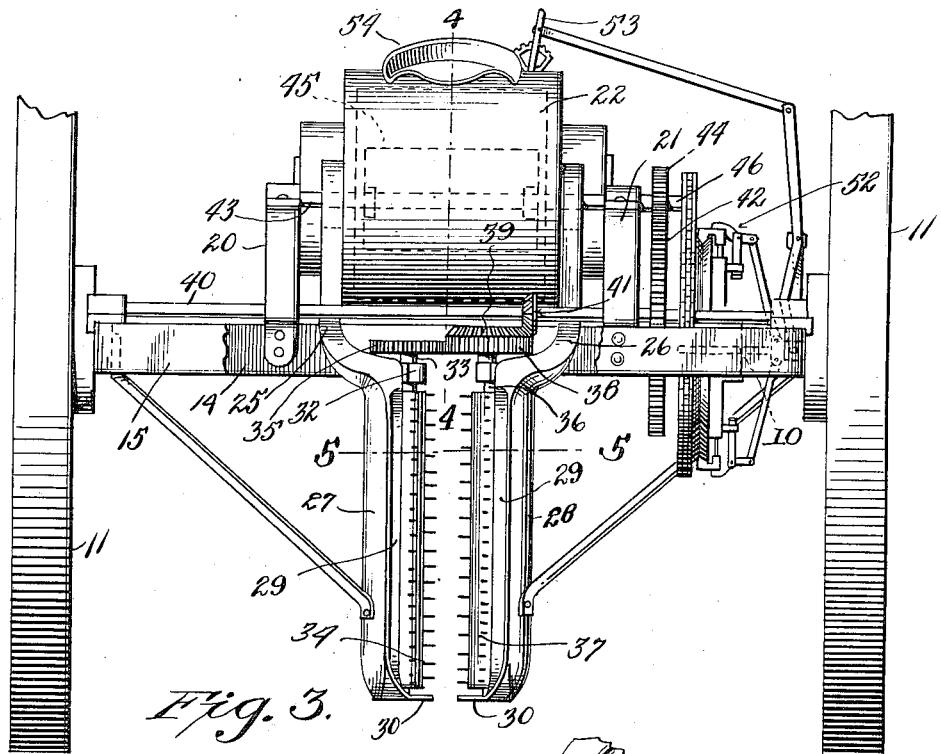

UNITED STATES PATENT OFFICE.

RUDOLPH F. BERAN, OF MOULTON, TEXAS.

COTTON-PICKING DEVICE.

1,169,915.  Specification of Letters Patent.  Patented Feb. 1, 1916.

Application filed March 20, 1914. Serial No. 826,065.

*To all whom it may concern:*

Be it known that I, RUDOLPH F. BERAN, a citizen of the United States, residing at Moulton, in the county of Lavaca, State of Texas, have invented certain new and useful Improvements in Cotton-Picking Devices; and I do hereby declare the following to be a full, clear, and exact description of the invention, such as will enable others skilled in the art to which it appertains to make and use the same.

This invention relates to cotton picking machines.

The object of the invention resides in the provision of a machine of the character named which will efficiently operate to remove the cotton from the boll and move same into the machine where the shells and trash will be separated from the cotton and the latter subsequently delivered into a receiving basket.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a cotton picking machine constructed in accordance with the invention; Fig. 2, a side view of same; Fig. 3, a front view of the machine; Fig. 4, a section on the line 4—4 of Fig. 1; Fig. 5, a section on the line 5—5 of Fig. 3; Fg. 6, a detail perspective view of one of the suction tubes; Fig. 7, a detail perspective view of a fragment of one of the vertical picking rollers, and Fig. 8, a section on the line 8—8 of Fig. 4.

Referring to the drawings the invention is shown as comprising an axle 10 which has fixed on the ends thereof traction wheels 11. Rotatably supported upon the axle 10 is a frame A which includes side members 12 and 13, a rear member 14 and a front member comprising sections 15 and 16 having their adjacent ends bent outwardly as at 17 and 18 respectively. Pivoted between the ends 17 and 18 is a draft tongue 19 whereby suitable draft animals may be attached to the machine for the purpose of drawing same along the ground. The rear member 14 and the section 15 of the front member are connected by an inverted U-shaped bar 20, while the section 16 of the front member and the rear member 14 are connected by an inverted U-shaped bar 21 corresponding to the bar 20. Supported upon the bars 20 and 21 is a casing 22 having an open rear portion 23 and further having a portion of its bottom wall perforated to form a screen 24. Leading from the sides of the casing 22 adjacent the forward end of said casing are suction tubes 25 and 26, respectively, the outer ends of which terminate respectively in vertical portions 27 and 28 provided with mouths 29 of a flared type. Extending laterally from the lower end of the vertical portion 27 is a plate 30 provided with a bearing 31 which alines with a bearing 32 mounted on the upper end of the portion 27.

Rotatably mounted in the bearings 31 and 32 is a vertical shaft 33 which has fixed thereon between the bearings 31 and 32 a picker roller 34 and further has fixed thereon above the bearing 32 a gear 35. The portion 28 of the tube 26 has similarly mounted thereon a vertical shaft 36 which has fixed thereon a picker roller 37 and a gear 38, the latter meshing with the gear 35. Mounted on the upper end of the gear 38 is a beveled gear 39 for a purpose that will presently appear. Journaled in suitable brackets carried by the side members 12 and 13 is a transverse shaft 40 which extends across the upper end of the vertical shafts 33 and 36 and has fixed thereon a beveled gear 41 meshing with the bevel gear 39. The shaft 40 also has fixed thereon a gear 42 disposed adjacent the outer edge of the bar 21. Journaled in suitable brackets carried by the bars 20 and 21 is a transverse shaft 43 which extends through the casing 22 and has fixed thereon a gear 44 meshing with the gear 42. Fixed upon the shaft 43 within the casing 22 is a suction fan 45. Journaled in suitable bearings carried by the bars 20 and 21 and disposed at the rear of the axle 10 is a transverse shaft 46 which has fixed thereon within the casing 22 a toothed roller 47 which catches the seed cotton and dusts and throws it into a suitable receptacle at the rear of the machine. Fixed on the shaft 46 adjacent the outer edge of the bar 21 is a sprocket wheel 48 which alines with a sprocket wheel 49 loosely mounted upon the axle 10 and a sprocket wheel 50 fixed upon the shaft 40. Traveling on the sprocket wheels 48, 49 and 50 is a sprocket chain 51. The sprocket wheel 49 is adapted to be connected with the axle 10 for rotation with the latter by means of a clutch mechanism 52 operated through the medium of a lever 53 from the driver's seat 54.

From the foregoing construction it will be obvious that as the machine is drawn along the ground the rollers 34 and 37 will be rotated in the direction indicated by the arrows in Fig. 5. At the same time the fan 45 and the roller 47 will also be rotated with the result that as the cotton plants move between the rollers 34 and 37 the cotton will be dislodged from the bolls and sucked into the tubes 25 and 26 and thence into the casing 22. This cotton will then be caught by the roller 47 and thrown into a receiving basket 55 as previously mentioned.

Pivoted upon the end 18 of the section 16 is a lever 56 which carries a spring pawl 57 coöperating with a toothed segment 58 mounted upon the end 18. The lever 56 is connected to the rear end of the tongue 19 by means of a link 59 so that by manipulating the lever 56 the front of the machine can be raised and lowered.

What is claimed, is:—

In a cotton picking machine, the combination of a wheeled frame, a casing supported by the frame and having a discharge opening in its rear end, a suction fan mounted in the casing, traction operated means for rotating said fan, suction tubes leading from respective sides of the casing and extending forwardly, each of said tubes terminating in a depending portion provided with a lateral mouth, a rearwardly extending wing at the lower end of each depending portion disposed in a plane substantially at right angles to the vertical axis of the depending portion, a bearing formed on said wing, a bearing on the upper end of the depending portion alined with the bearing on the wing, a picker roller rotatably mounted in the alined bearings and disposed entirely to the rear of the mouth, and traction operated means for rotating said picker rollers.

In testimony whereof, I affix my signature, in the presence of two witnesses.

RUDOLPH F. BERAN.

Witnesses:
    JOHN MARES,
    ADOLPH BERAN.